United States Patent [19]

Winchell

[11] 4,419,323
[45] Dec. 6, 1983

[54] METHOD FOR MANUFACTURING A PLASTIC CONTAINER WITH NON-CORING PENETRABLE WALL PORTION

[75] Inventor: David A. Winchell, Twin Lakes, Wis.

[73] Assignee: Baxter Travenol Laboratories, Inc., Deerfield, Ill.

[21] Appl. No.: 311,094

[22] Filed: Oct. 13, 1981

Related U.S. Application Data

[63] Continuation of Ser. No. 119,716, Feb. 8, 1980, abandoned.

[51] Int. Cl.³ .............................................. B29C 17/07
[52] U.S. Cl. ................................. 264/523; 215/1 C; 264/525; 264/537; 425/525
[58] Field of Search ................... 215/1 C, 247, 248; 150/8; 128/272; 141/329, 330; 264/523, 524, 525, 526, 537, 540, 541; 425/525, 524

[56] References Cited

U.S. PATENT DOCUMENTS

| | | | |
|---|---|---|---|
| 3,343,699 | 9/1967 | Nicko | 215/38 |
| 3,851,029 | 11/1974 | Cornett et al. | 264/89 |
| 3,977,555 | 8/1976 | Larson | 215/247 |
| 4,113,129 | 9/1978 | Cambio, Jr. | 215/1 C |
| 4,172,534 | 10/1979 | Cambio | 215/247 |
| 4,178,976 | 12/1979 | Weiler et al. | 150/0.5 |
| 4,234,095 | 11/1980 | Safianoff | 215/232 |

FOREIGN PATENT DOCUMENTS

| | | |
|---|---|---|
| 2027749 | 12/1971 | Fed. Rep. of Germany . |
| 955745 | 1/1950 | France . |
| 1182762 | 6/1959 | France . |

*Primary Examiner*—Jan H. Silbaugh
*Attorney, Agent, or Firm*—Paul C. Flattery; John P. Kirby, Jr.; Bradford R. L. Price

[57] ABSTRACT

A plastic blow-molded container is disclosed having a penetrable wall portion or site which is sufficiently thin to permit piercing by a needle, spike or the like without coring or fragmenting, and a thicker recessed wall portion adjacent to the penetrable portion. The penetrable portion is formed during the blow-molding process by expanding the plastic parison over a projection in the mold cavity and into an adjacent recess in the cavity. The thin penetrable portion of the container is formed within the mold recess and the thicker recessed portion of the container is formed by the mold projection.

6 Claims, 11 Drawing Figures

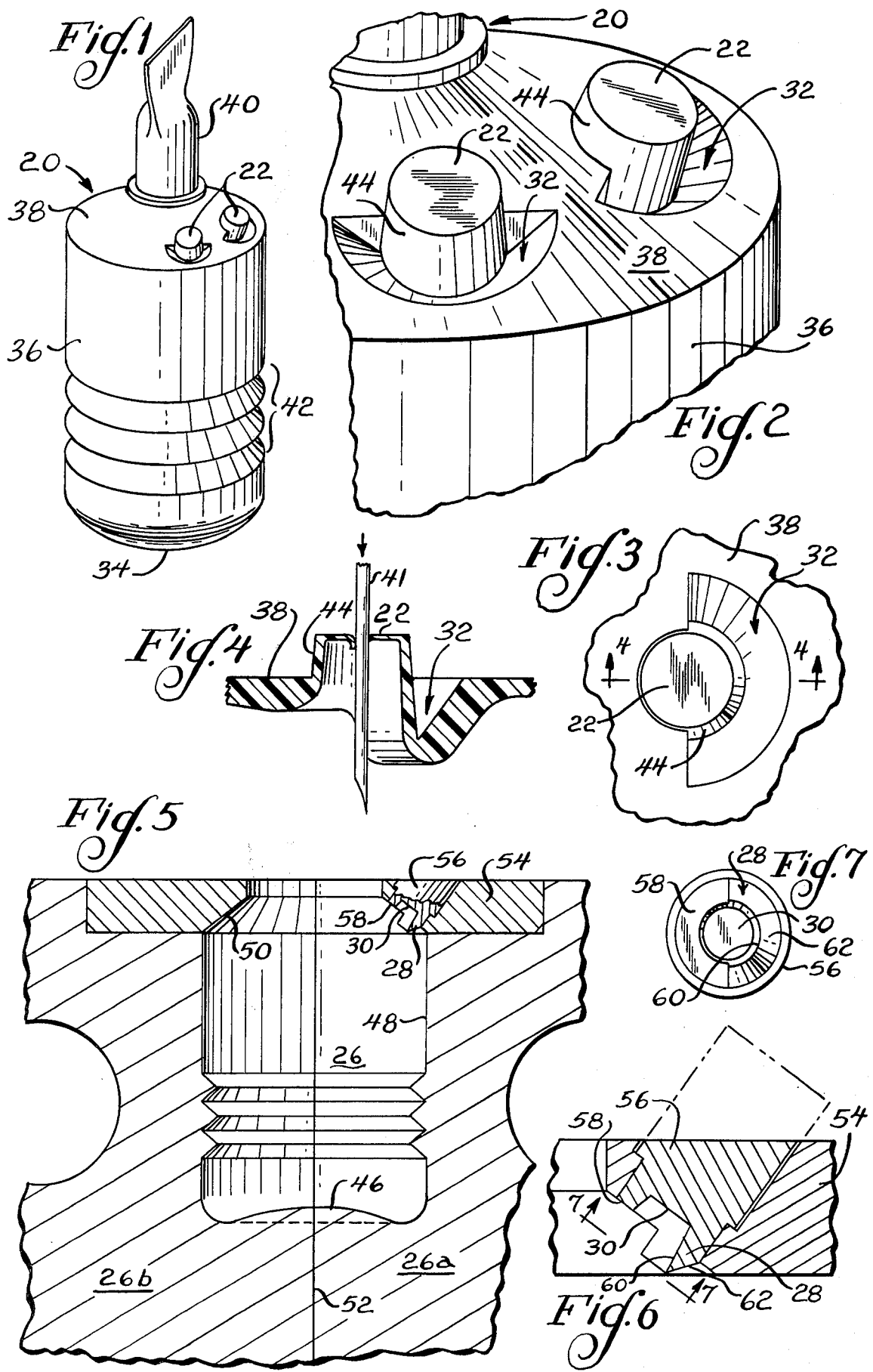

METHOD FOR MANUFACTURING A PLASTIC CONTAINER WITH NON-CORING PENETRABLE WALL PORTION

This is a continuation of application Ser. No. 119,716, filed Feb. 8, 1980 now abandoned.

The present invention generally relates to plastic containers. More particularly, it relates to plastic containers in which the contents are withdrawn or added by puncturing the wall of the container with a needle-like member.

It is often desirable and convenient to package liquids in sealed plastic containers for later dispensing through a needle or needle-like member, such as a spike, which is inserted through the wall of a container. For example, in the medical field, a variety of liquid medicaments and other fluids, such as sterile water and saline solution, are often packaged in small glass or plastic "unit-dose" vials which hold a small quantity of the fluid, usually the amount normally required for a single patient dose. The contents of the vial are withdrawn into a syringe, the needle of which is inserted through a penetrable portion of the container or through an open end of the container, typically provided by removing a break-off closure. Vials with break-off closures often require additional manufacturing steps or operations which tend to slow the production process, as well as extra quality control procedures.

On the other hand, vials with penetrable portions also have drawbacks. Glass vials, for example, are relatively expensive and require careful handling to prevent breakage and quality control procedures to detect minute cracks or glass particles in the fluid. Although plastic vials do not suffer from these shortcomings, both plastic and glass vials with penetrable portions have a potential for "coring" when the needle is inserted into the container. Coring generally is a cutting of the rubber or plastic during insertion of the needle, resulting in particles of plastic becoming lodged in the needle lumen or falling into the vial.

Before a needle can be inserted through a container wall, the surface of the container must also be sterilized, usually with a cotton swab wet with a sterilizing agent. In one previous plastic unit-dose container, a target area for puncture was delineated by a raised rib on the container. However, this resulted in shallow collection or pooling of sterilizing agent at the puncture site, with the potential for rendering the contents of the vial unusable when the wall is punctured by a needle.

Accordingly, as set forth in the appended claims, it is a general object of the present invention to provide an improved plastic container or vial with a penetrable wall portion which does not suffer from the drawbacks discussed above.

It is a more particular object of the present invention to provide a plastic container with a penetrable wall portion which is not subject to coring upon penetration by a needle-like member and may be sterilized without retaining or pooling sterilizing agent.

It is another object of the present invention to provide a container with a plurality of penetrable wall portions to permit withdrawal of fluid from one penetrable portion while displacement air is admitted through another.

These and other objects of the present invention are set forth in the following detailed description of the preferred embodiment of the present invention as shown in the attached drawings, of which:

FIG. 1 is a perspective view of a plastic vial having a pair of penetrable wall portions embodying the present invention.

FIG. 2 is an enlarged perspective view of the penetrable wall portions of the vial of FIG. 1.

FIG. 3 is top plan view of one of the penetrable wall portions of the vial of FIG. 1.

FIG. 4 is a sectional view taken along line 4—4 of FIG. 3.

FIG. 5 is a vertical sectional view of molding apparatus embodying the present invention and employed in making the vial of FIG. 1.

FIG. 6 is an enlarged sectional view, partially removed, of the portion of the mold apparatus of FIG. 5 which forms the penetrable wall portion of the vial of FIG. 1.

FIG. 7 is a plan view of the interior end of a mold insert member employed in molding the penetrable wall portion of the vial of FIG. 1.

Figure 8:
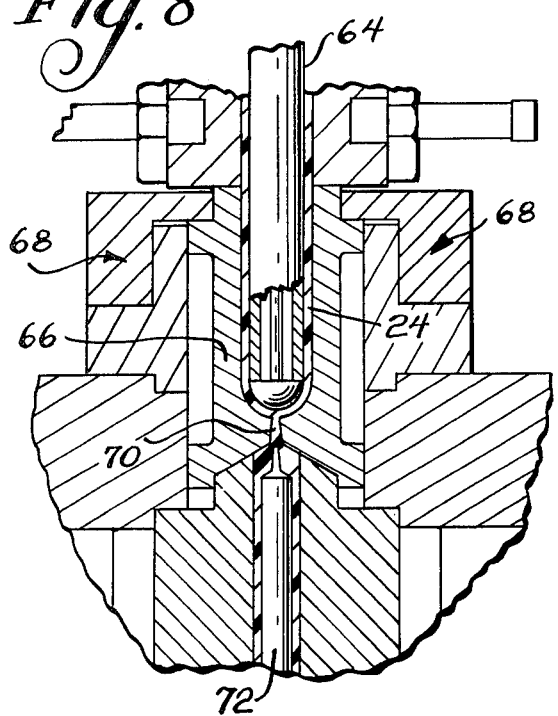
FIG. 8 is a vertical sectional view of mold apparatus illustrating the first step of making the vial in FIG. 1.
Figure 9:
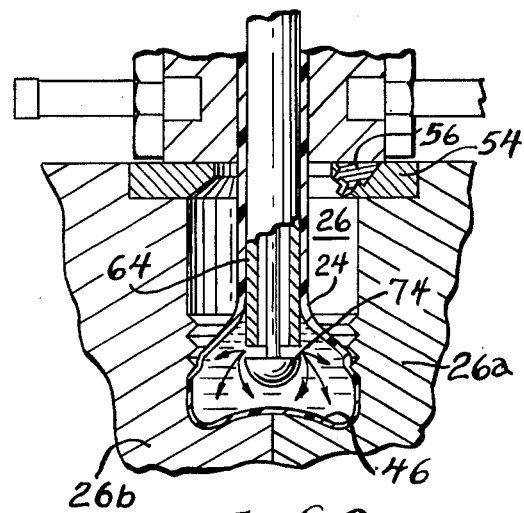
FIG. 9 is a vertical sectional view of mold apparatus employed in a further step of making the vial shown in FIG. 1.
Figure 10:
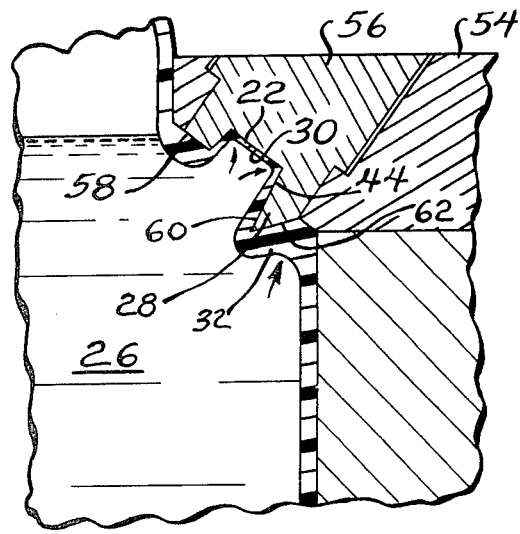
FIG. 10 is an enlarged sectional view illustrating the molding of the penetrable wall portion of the vial of FIG. 1 in accordance with the present invention.
Figure 11:
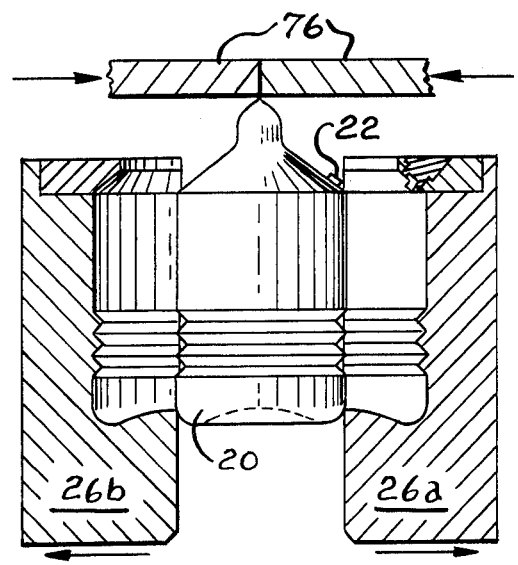
FIG. 11 illustrates the step of sealing and releasing the vial of FIG. 1 from the mold apparatus.

The present invention, as depicted in the attached drawings for the purpose of illustration and not limitation, is generally embodied in a plastic vial 20 which has at least one penetrable wall portion 22, through which a needle or the like may be inserted to withdraw or add-to the contents thereof. Referring briefly to FIGS. 8–10, the plastic vial 20 is of the type molded by expanding a heated plastic parison 24 against the interior surface of a mold cavity 26, sometimes referred to as blow molding. In accordance with the present invention, the penetrable wall portion 22 is molded sufficiently thin to prevent coring by expanding the plastic parison 24 over an inwardly extending projection or step 28 in the mold cavity and into an adjacent recessed area 30. It is understood that the projection 28, somewhat like a dam, restricts the flow of plastic into the adjacent recessed area 30 as seen, e.g., in FIG. 10. Accordingly, the vial 20 which results from this molding process has a very thin upstanding penetrable wall portion 22, which is formed within the mold cavity recess 30, adjacent to a thicker indented wall portion 32, which is formed around the mold projection or step 28. As shown in FIGS. 1 and 2, the vial 20 may include at least a pair of preferably adjacent penetrable wall portions 22, one, for example, which is punctured to admit displacement air as fluid is withdrawn into a syringe inserted through the other. The adjacent positioning of the penetrable wall portions permits sterilization of both in one swabbing motion, while the flat surface of the penetrable portion prevents pooling or collecting of the sterilizing agent.

Turning now to a more detailed description of the preferred embodiment of the present invention as illustrated in the attached drawings, the vial 20 is depicted as a unit-dose container, which holds a small quantity of medical liquid, typically the amount needed for a single dosage for a human patient. The vial 20 is of one-piece, integral plastic construction, preferably made of polyolefin material such as polyethylene or polypropylene. It has a bottom wall 34, a generally cylindrical upright side wall 36, and an upwardly inclined shoulder 38 which terminates in an extending neck portion 40. The end of the neck 40 is flattened by a heat seal to keep the contents of the vial in a sterile condition. To permit contraction or expansion of the vial 20 upon removal or addition of liquid, the sidewall 36 has a collapsible, accordian-shaped portion generally at 42. In addition, the collapsible sidewall permits manual depression of the bottom of the container to force contents from the vial more quickly if emptied through the neck 40.

Most often, the contents of the container will be withdrawn by inserting the needle 41 of a syringe through one of the penetrable wall portions 22, which are also commonly called injection sites (FIG. 4). It should be recognized, however, that these sites may be used for adding as well as withdrawing fluid from the vial. For example other fluids may be added if admixture of the contents of the vial is needed. Upon the addition of fluid, the accordian section 42 permits expansion of the container.

In accordance with one aspect of the present invention, coring or fragmentation of plastic in the penetrable wall portion 22 when punctured by a needle-like member, such as a needle or spike, is prevented by molding the vial 20 so that the penetrable wall portion 22 is very thin, preferably less than about 0.01 inches thick, as compared to the thickness of other portions of the vial which may be between about 0.02 and 0.03 inches. Referring particularly to FIGS. 2–4, the penetrable wall portion 22 is generally circular in shape and is located at the flat end of a generally truncated conical projection, generally at 44, which extends upwardly from the shoulder 36 of the vial 20. As noted earlier, the penetrable wall portion 22 is molded by expanding a plastic parison 24 over a projection or step 28 in the mold cavity 26 and into an adjacent recess 30. The projecting step 28 forms the recessed portion 32 in the vial 20, which of course corresponds in shape to the projecting step. As best seen in FIG. 4, the recessed wall portion 32 of the vial 20 is generally cross-sectionally v-shaped, with the sidewall of the truncated projection 44 extending down into and forming one side of the recess. Referring to FIGS. 2 and 3 for clarity, it may be seen that the recess 32 circumscribes the truncated conical projection 44 for about 180° on the lower side of the shoulder 38.

As noted earlier, the vial 20 preferably has two penetrable portions or injection sites 22. This provides an extra site which may be punctured or into which a needle-only may be inserted to allow displacement air to enter the vial as fluid is withdrawn through the other site. This permits virtually all the fluid in the vial to be easily withdrawn into a syringe, without excessive suction force which may tend to extract air bubbles from the fluid or cause collapse of the vial wall.

Also, the injection sites 22 are typically "prepped" before insertion of a needle by swabbing the surface with sterilizing agent. The close adjacent positioning of the two sites permit both to be prepped in one swabbing motion, and the flat surface of the site does not collect or pool the sterilizing agent.

The injection sites 22 themselves are not necessarily large. For example, in the illustrated embodiment, for a vial with a diameter of almost one inch, the injection sites preferably have a diameter of about 0.09 inches and are spaced about 25° apart on the shoulder of the vial.

Turning now to FIGS. 5–7, the vial 20 is molded within the mold cavity 26, which has a shape of the desired vial 20, and thus similarly includes a bottom wall surface 46, sidewall surface 48 and shoulder surface 50. However, it should be noted that a vial or container need not have this particular shape to incorporate a penetrable wall portion in accordance with the present invention. The illustrated mold cavity 26 is generally formed of two mold halves, 26(a) and 26(b), each of which define one half of the body of the vial and are joined at the parting line 52 and topped by a neck ring 54 which defines the shoulder 50.

For ease of machining and assembly, the conical recess 30 and projecting step 28 in the mold cavity 26 which, respectively, form the penetrable wall portion 22 and recessed wall portion 32 of the vial, are defined on the inside surface of a cylindrical insert 56 received within a drilled opening in the neck ring 54. The recess 30 is generally centrally located at the end of the insert and preferably of truncated conical shape, corresponding to the shape of the truncated conical projection 44 of the vial 20 formed therewithin, and having a draft angle for easy removal of the vial from the mold. Of course, other shapes, e.g., spherical or inverted-dish shaped, could also be used without departing from the present invention. As best seen in FIGS. 5, 6 and 10, one half of the inside surface 58 of the insert is flush with the inside surface of the neck ring, but the other half, on the lower side of the shoulder, extends into the mold cavity to form the projecting step 28 of the cavity surface. In a vial with an injection site of about 0.09 inches in diameter, as described above, the step 28 extends about 0.05 inches past the inside surface of the neck ring. Referring to FIGS. 6 and 7 together, it may be seen that the portion of the insert 56 which forms the step 28 is generally arcuate in that it extends for 180° around the truncated conical recess 30, and also has a tapered cross-sectional shape with one side 60 of the tapered portion also being a wall of the conical recess and the other side 62 facing generally downwardly into the mold cavity. Although the preferred shape of the projecting step 28 has been described, as with the conical recess 30, the projecting step may be of various shapes or sizes and still function in accordance with the present invention to provide a vial with a non-coring penetrable wall portion. It may be seen in FIG. 5 that the insert 56 is mounted in the neck ring 54 diagonally opposite the lower left corner of the cavity 26. With the finished vial also having this relationship, there is plenty of room to insert a needle into the penetrable wall portion without undue risk of also penetrating a side or bottom wall of the vial. Although only one insert 56 is shown in FIGS. 5 and 6 for simplicity, to form a pair of penetrable wall portions as shown in FIG. 1, would of course require two spaced apart inserts as described above or an equivalent construction.

The actual molding of the preferred vial 20 is illustrated in FIG. 8–11. FIG. 8 depicts the formation of the plastic parison 24 about a fill tube 64, through which the contents of the vial are injected. The fill tube 64 is first positioned within the cavity of a mold 66 mounted within mold framework 68. The mold cavity defines a narrow space around the fill tube, into which molten plastic is injected via bottom sprue 70 in the cavity. Flow of molten plastic into the parison mold cavity is regulated by a control pin 72 which is axially movable to oopen or block flow through the sprue 70.

After the plastic parison 24 has been injection molded around the fill tube 64, the fill tube and parison are removed from the mold 66 and inserted into the mold cavity 26 which has the selected shape of the vial 20. The fill tube and parison are positioned in the cavity with only a relatively small distance between the bottom of the parison 24 and the bottom surface 46 of the cavity. The parison 24 is then expanded, as shown in FIG. 9, to conform to the inside surface of the mold cavity by pressurized injection of the actual contents of the vial through valve 74 in the lower end of the fill tube. Although not intending to rely upon a single theory for the success of the present invention, it is presently understood and believed that the parison expands initially to conform to the lower surface of the cavity and thence upwardly along the sidewalls and shoulder of the mold cavity. As the plastic moves upwardly along the sidewalls, the inwardly protruding, wedge-shaped step 28 acts as a plastic dam, restricting or blocking the flow of plastic material into the truncated conical recess 30. Thus, as seen in FIG. 10, the portion of the plastic parison spanning the recess thins as it moves into the recess and results in a uniform and very thin penetrable wall portion 22 across the end of the truncated conical recess. In other words, projection 28 is positioned between the recess 30 and the lower end of the fill tube, with the downwardly facing surface 62 thereof being engaged first by the plastic flow to obstruct and restrict the otherwise natural tendency of the molten plastic to flow into the recess 30.

After the vial 20 is filled with liquid, the fill tube is removed, a heated pin is inserted into the neck to melt the inside surface and a pair of sealing jaws 76 compress the end of the neck 40 to form a flattened heat seal which preserves the sterility of the vial contents. The mold halves 26(a) and 26(b) then separate to release the finished vial.

In summary, the present invention is directed to a unique plastic container with a very thin, non-coring penetrable wall portion that is easy to produce in large quantities and at relatively low cost. The pair of penetrable wall portion formed in the illustrated embodiment permit full utilization of the vial contents, are easy to prep and do not pool or collect liquid used to sterilize the surface. Although described in terms of the preferred embodiment, the present invention, as set forth in the following claims, is intended to include those equivalent structures and steps, some of which may be apparent upon initial reading of this specification, and others which may only become apparent after some study.

What is claimed is:

1. A method for manufacturing a plastic container having a penetrable wall portion, which is thin relative to the thickness of the container walls, from a tubular plastic parison about a fill tube, the steps comprising:
   (a) providing a mold cavity having a bottom wall surface, a side wall extending upwardly from the bottom wall surface, a projecting step above the bottom wall surface and projecting from the side wall and a recess adjacent to and above at least a portion of the projecting step;
   (b) inserting the fill tube with the plastic parison thereabout into the mold cavity;
   (c) expanding the parison to conform to the inside surface of the mold cavity by the application of pressure from the fill tube, below the projecting step in the mold cavity;
   (d) blocking the flow of plastic from the expanding parison at the projecting step as the parison expands from the bottom wall surface along the side wall of the mold cavity; and
   (e) thereby arranging the portion of the plastic parison spanning the recess so that the portion diminishes in thickness as it moves into the recess toward the end thereof, the mold cavity recess end corresponding to the thin penetrable wall portion of the container.

2. The method in accordance with claim 1, wherein the step of blocking the flow of plastic results in a penetrable wall portion in the container sufficiently thin so as to prevent coring of plastic when penetrated by a needle-like member.

3. A method for manufacturing a plastic container having a thin, penetrable wall portion relative to the thickness of the container walls, from a tubular plastic parison closed at one end about a fill tube, the steps comprising:
   (a) providing a mold cavity having a bottom wall surface, a side wall extending upwardly from the bottom wall surface, a projecting step above the bottom wall surface and projecting from the side wall and a recess adjacent to and above at least a portion of the projecting step;
   (b) inserting the fill tube with the plastic parison thereabout into the mold cavity;
   (c) expanding the parison to conform to the inside surface of the mold cavity by the application of pressure from the fill tube, below the projecting step in the mold cavity, the parison expanding from the bottom wall surface of the cavity along the side wall of the mold cavity, toward the projecting step; and
   (d) restricting the flow of plastic from the expanding parison at the projecting step such that the portion of the plastic parison spanning the recess thins as it moves into the recess toward the end thereof, the mold cavity recess end corresponding to the thin penetrable wall portion of the container.

4. The method in accordance with claim 3, wherein the step of restricting the flow of plastic results in a penetrable wall portion in the container sufficiently thin so as to prevent coring of plastic when penetrated by a needle-like member.

5. The method in accordance with claims 1 or 3, wherein the penetrable wall portion is less than about 0.01 in. thick.

6. A method for manufacturing a plastic container having a thin, penetrable wall portion relative to the thickness of the container walls, from a tubular plastic parison closed at one end about a fill tube, the steps comprising:
   (a) providing a mold cavity having a bottom wall surface, a side wall extending upwardly from the bottom wall surface, a shoulder extending upwardly and inwardly from the side wall, a projecting step projecting from the shoulder, above the bottom wall surface, and a recess adjacent to and above at least a portion of the projecting step;
   (b) inserting the fill tube with the plastic parison thereabout into the mold cavity;
   (c) expanding the parison to conform to the inside surface of the mold cavity by the application of pressure from the fill tube, below the projecting step in the mold cavity, the parison expanding from the bottom wall surface of the cavity along the side wall of the mold cavity, toward the projecting step; and (d) restricting the flow of plastic from the expanding parison at the projecting step such that the portion of the plastic parison spanning the recess thins as it moves into the recess toward the end thereof, the mold cavity recess end corresponding to the thin penetrable wall portion of the container.

* * * * *